Oct. 20, 1953   S. M. UDALE   2,655,906
TWO-CYCLE COMBUSTION CHAMBER
Filed Aug. 5, 1952
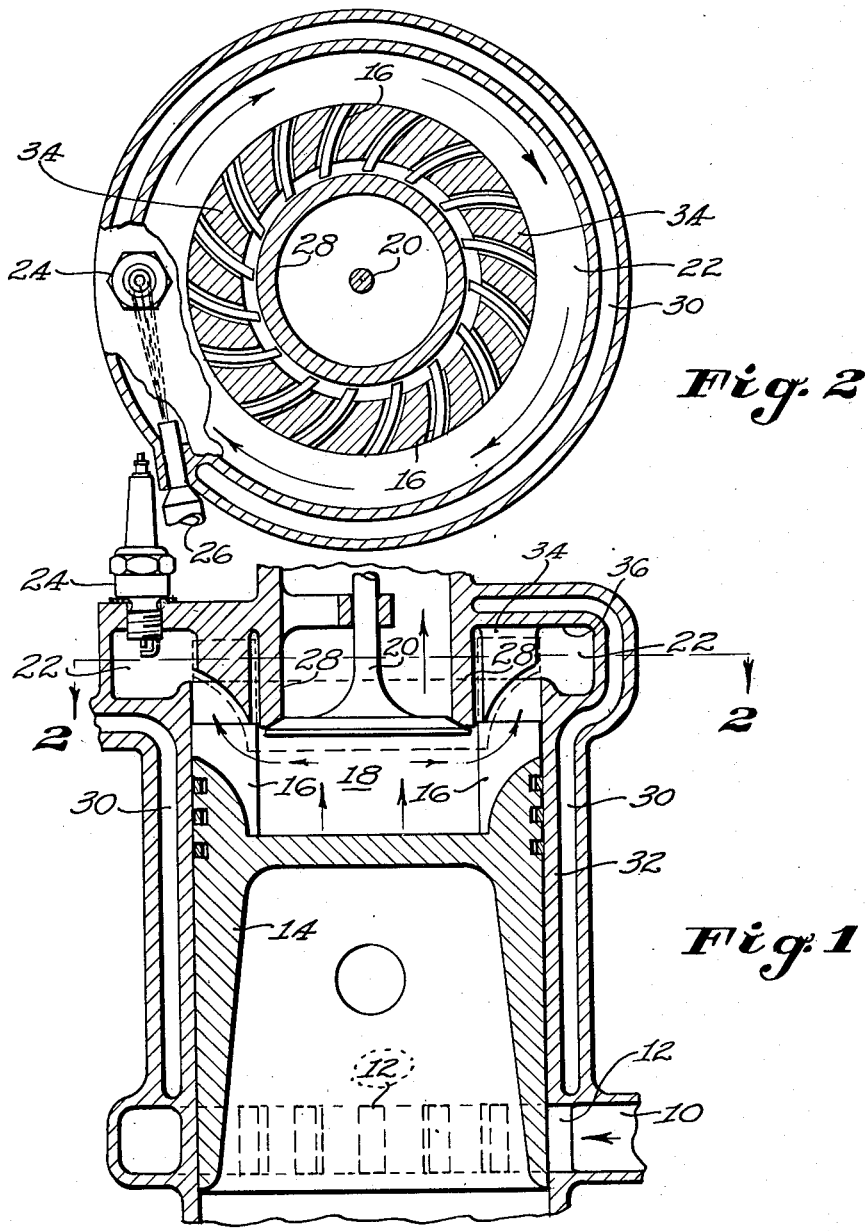
INVENTOR.

Patented Oct. 20, 1953

2,655,906

UNITED STATES PATENT OFFICE 2,655,906

TWO-CYCLE COMBUSTION CHAMBER

Stanley M. Udale, Detroit, Mich., assignor to Holley Carburetor Company, Detroit, Mich., a corporation of Michigan Application August 5, 1952, Serial No. 302,760

2 Claims. (Cl. 123—32)

1

The objects of this invention are:

(a) To reduce the deposits of carbon, lead, etc. on the walls of the combustion chamber, exhaust valves, etc.

(b) To inject fuel into an annular combustion chamber in which the air is rotating at a high speed.

(c) To establish a flame front by means of a spark plug and to form combustible mixtures in front of this front so that the engine will respond to fuel control with the air throttle wide open as though it were a diesel engine.

(d) To positively rotate the air before the fuel is injected by air trapped between the cylinder head and piston.

(e) To maintain the warmest possible combustion chamber when operating with the smallest possibly quantity of fuel.

(f) To cool the piston.

(g) To make a special piston which will make (b), (d), (e) and (f) possible.

It has been discovered that the lead coating increases at low temperature so that by increasing the temperature of the combustion chamber, the coating is greatly reduced.

Figure 1 shows a cross-sectional elevation.

Figure 2 shows a plan view taken on plane 2—2 of Fig. 1.

In the figures:

10 is the air entrance for compressed air from a supercharger (not shown).

12 are the inlet ports inclined to set up a clockwise rotation in the cylinder when looking down.

14 is the piston which uncovers at the end of its downward stroke the ports 12 to admit compressed air from 10. These ports are shaped to create clockwise rotation of the air to overcome the tendency of the webs 16 in piston 14 which have a tendency to create an anti-clockwise rotation.

16 are inclined webs in the top of the piston to create clockwise motion of the air when the air is driven out of chamber 18 (see Fig. 2) at the end of the upward travel of piston 14.

20 is the exhaust valve operated by mechanism not shown.

22 is the annular combustion chamber in which the air is rotated in a clockwise direction by the air trapped in chamber 18 being forced through the webs 16 by the upward travel of the piston 14.

24 is a spark plug located in the annular combustion chamber 22.

26 is a fuel injection nozzle directed at the spark plug 24. The location of the nozzle is important but can only be found by trial and error.

2

28 is the exhaust valve cage in which the exhaust valve 20 is guided.

30 is a water jacket surrounding the combination chamber 22 and the upper portion of the cylinder 32 in which the piston 14 slides.

The location of the nozzle 26 with reference to the spark plug 24 follows patent to E. M. Barber #2,484,009 of October 11, 1949, etc.

34 is one of 16 projections from the cylinder head 36 which projects between the webs 16 and so raises the compression ratio to about 11. The compression ratio depends on the nature of the fuel. Low compressions will call for a larger combustion chamber 22 or smaller projections 34.

Operation

The compressed air admitted when piston 14 uncovers the ports 12 rotates clockwise in the cylinder and overcomes and neutralizes the tendency of piston webs 16 to create anti-clockwise rotation and finally blows the burned gases out of the exhaust valve 20 and enough extra air is provided so as to partly scavenge the cylinder including the annular combustion chamber 22. The valve 20 is partly closed and the compressed air is then still further compressed and is eventually trapped in the chamber 18 below the hot exhaust valve 20. During the last portion of its upward travel the piston 14 forces air along the curved paths between the webs 16 and projections 34. A clockwise spin is thus positively imparted to the air in the annular combustion chamber 22. The fuel is then injected at or near the upper dead center of piston 14 from the fuel injection nozzle 26 and the spray is ignited by the spark plug 24 in a manner similar to that shown in Fig. 2, Patent #2,534,346 to Fenney issued December 19, 1950. One problem with this type of injection is thus solved. The combustion chamber is kept sufficiently warm during idle when the mixture ratio may be as low as 100 to 1. The exhaust valve is located in the cylinder head so as to keep the combustion chamber as warm as possible during idle. The air contained between the webs 16 and the projection 34 next to the exhaust valve 20 acts as a cushion to prevent knock. Again, the forced flow of air out of chamber 18 (in which it is trapped) makes the accumulation of a coating take place at a slower rate than is normal with a given fuel. The webs 16 may be inclined more to give more rotation. The slight enlargement at the point of fuel entry may be reduced or eliminated as discussed below.

The annular combustion chamber 22 is shown enlarged at the point at which the nozzle 26 is located and at the location of the spark plug 24. This is a preferred construction, but the jacket 30 may extend around the combustion chamber 22, in which case the combustion chamber 22 will be of uniform cross-sectional curves all the way around without departing from the teaching of this patent. The operation would be similar without the enlarged combustion chamber at the point where the fuel nozzle 26 discharges. The heat absorbed by the 16 cylinder head projections 34 are given back to the compressed air at the end of the compression stroke and thus the thermal efficiency at low loads is maintained.

What I claim is:

1. In an internal combustion engine of the type in which fuel is injected close to a spark plug and having a cylinder, a cylinder head and a piston, a narrow annular combustion chamber surrounding the head of the cylinder and forming a part thereof, channels in the head of the cylinder, corresponding projections on the head of the piston adapted to fit into said channels so as to squeeze the air caught therebetween out into said annular chamber, said channels and projections being curved and inclined in radial lines so as to cause rotation of the air in said combustion chamber so that the injected fuel is carried across the spark plug.

2. In an internal combustion engine of the type in which fuel is injected close to a spark plug and having a cylinder, a cylinder head and a piston, a narrow annular combustion chamber surrounding the head of the cylinder and forming a part thereof, curved projections on the head of the piston adapted to create rotation of compressed air in said annular combustion chamber so that the injected fuel is carried across the spark plug.

STANLEY M. UDALE.

References Cited in the file of this patent

UNITED STATES PATENTS

| Number | Name | Date |
| --- | --- | --- |
| 1,691,182 | Davol | Nov. 13, 1928 |